Sept. 30, 1924.  
J. M. MANNING  
1,510,184  
STORAGE BATTERY SUPPORT  
Filed Aug. 16, 1921

Inventor  
J. M. Manning,

By *E. Hume Talbert*

Attorney

Patented Sept. 30, 1924.

1,510,184

UNITED STATES PATENT OFFICE.

JOHN M. MANNING, OF FRIENDSHIP, TENNESSEE.

STORAGE-BATTERY SUPPORT.

Application filed August 16, 1921. Serial No. 492,845.

*To all whom it may concern:*

Be it known that JOHN M. MANNING, a citizen of the United States of America, residing at Friendship, in the county of Crockett and State of Tennessee, has invented new and useful Improvements in Storage-Battery Supports, of which the following is a specification.

The object of the invention is to provide a means for supporting and protecting a storage battery against the jars and vibrations which are incident to the use thereof upon motor vehicles and which jarring and vibration are recognized as injurious to the battery and as operating to detract from the efficiency and durability thereof; and with this object in view the invention consists in a construction and combination of parts of which a preferred embodiment is shown in the accompanying drawings, wherein.

Figure 1:
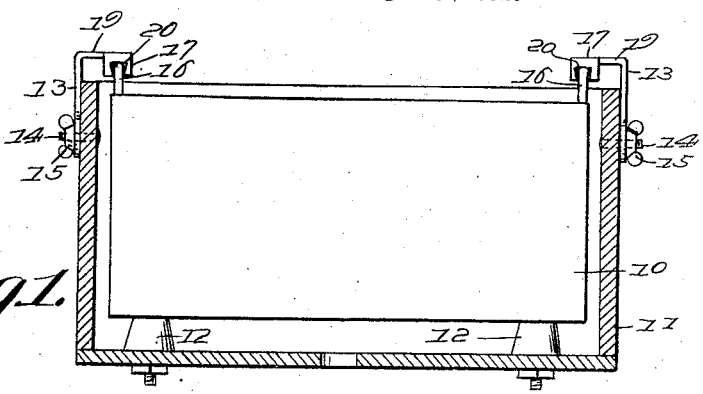
Figure 1 is a side view partly broken away of a storage battery box or housing constructed in accordance with the invention.
Figure 2:
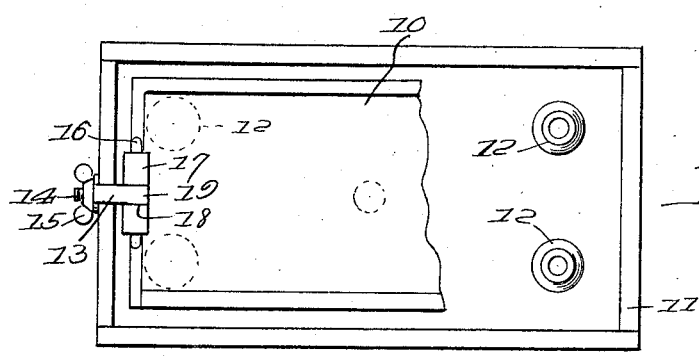
Figure 2 is a plan view partly broken away of the same.
Figure 3:
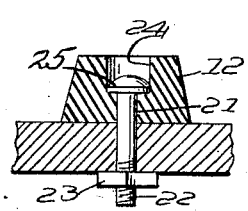
Figure 3 is a detail sectional view of one of the cushioning buttons employed at the bottom of the box or housing as a rest for the battery.
Figure 4:
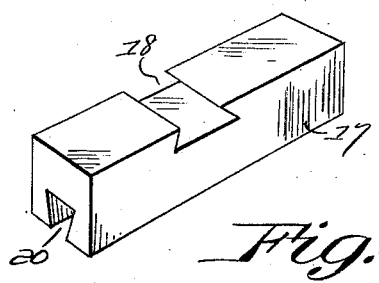
Figure 4 is a detail view of one of the handle cushions which is interposed between the battery handle and the clamp serving to retain the same in the proper position.

The battery 10 which may be of any of the commercial or preferred forms is arranged in a box or housing 11 constructed in shape and size to accommodate the battery under such conditions as to permit of spacing the same from the walls of the box, and arranged in the latter at its bottom is a jar absorbing seat consisting in the construction illustrated of a plurality of cushioning buttons 12 of rubber or equivalent material, a sufficient number of the same being employed to support the weight of the battery and absorb the movements of the box or housing derived from the vehicle body and thus maintain the battery in a substantially flat condition.

The battery is held in place in the box in proper relation with the supporting seat by means of clamps 13 engaged with bolts 14 fitted with wing nuts 15 or the equivalents thereof, said clamps being engaged with the handles 16 of the battery through the medium of cushioning blocks 17 also of rubber or like resilient material fitted upon the handles and provided with transverse seats 18 for the reception of the shanks 19 of the clamps, said seats 18 serving to prevent relative displacement of the clamps and cushioning blocks. The blocks are longitudinally channeled as shown at 20 for the reception of the handles of the battery, said channels for example and as illustrated being of cross sectionally dove-tailed form and being adapted to firmly clasp the battery handles when engaged by the clamps which by reason of the tightening of the wing nuts 15 serve to hold the battery in firm seating relation with the cushioning buttons 12.

In the construction illustrated these buttons are of frusto-conical form with axial bores 21 for the reception of the retaining bolts 22 which engage the bottom of the box and carry nuts 23 which space the base of the cushion from the surface of the said bottom, the opening in the cushion for the bolt being counterbored or enlarged as shown at 24 to receive the head of the bolt so that the cushion throughout the greater portion of its depth is unrestrained and is adapted to yield both compressively and laterally to effectively take up the jars received by the box or housing without communicating the same to the battery under such conditions as to involve injury thereto. A washer 25 of felt or other suitable material is interposed between the head of the bolt and the bottom of the counterbore 24 and serves to prevent rust from the bolt head causing any deleterious effects on the rubber cushion.

Having described the invention, what is claimed as new and useful is:—

1. A supporting device for a storage battery having a box or housing provided with a battery supporting cushioned seat and yielding means for holding the battery in bearing relation with the seat and consisting of clamps having a cushioned engagement with the battery case.

2. A supporting device for a storage battery having a box or housing provided with a battery supporting cushioned seat and yielding means for holding the battery in bearing relation with the seat and consisting of clamps having cushioning means for engaging the battery handles.

3. A supporting device for a storage battery having a box or housing provided with a battery supporting cushioned seat and yielding means for holding the battery in bearing relation with the seat and from the sides of the box or housing and consisting of clamps and resilient cushioning blocks interposed between the clamps and the battery handles.

4. A supporting device for a storage battery having a box or housing provided with a battery supporting cushioned seat and yielding means for holding the battery in bearing relation with the seat and consisting of longitudinally channeled resilient cushioning blocks fitted upon the battery handles and clamps engaged with said blocks.

5. A supporting device for a storage battery having a box or housing provided with a battery supporting cushioned seat and yielding means for holding the battery in bearing relation with the seat, said cushioned seat consisting of spaced resilient buttons centrally bored and counterbored for engagement by securing bolts of which the heads are disposed between the planes of the ends of the buttons to permit of compressive and lateral yielding movement of the portions of the buttons which are adjacent to the battery.

6. A supporting device for a storage battery having a box or housing provided with a battery supporting cushioned seat consisting of resilient buttons capable of vertically compressive and laterally yielding movement.

In testimony whereof he affixes his signature.

JOHN M. MANNING.